March 23, 1954  D. M. HINTZ  2,673,182
APPARATUS FOR SOFTENING, FILTERING, OR CONDITIONING WATER
Filed May 28, 1949  3 Sheets-Sheet 1
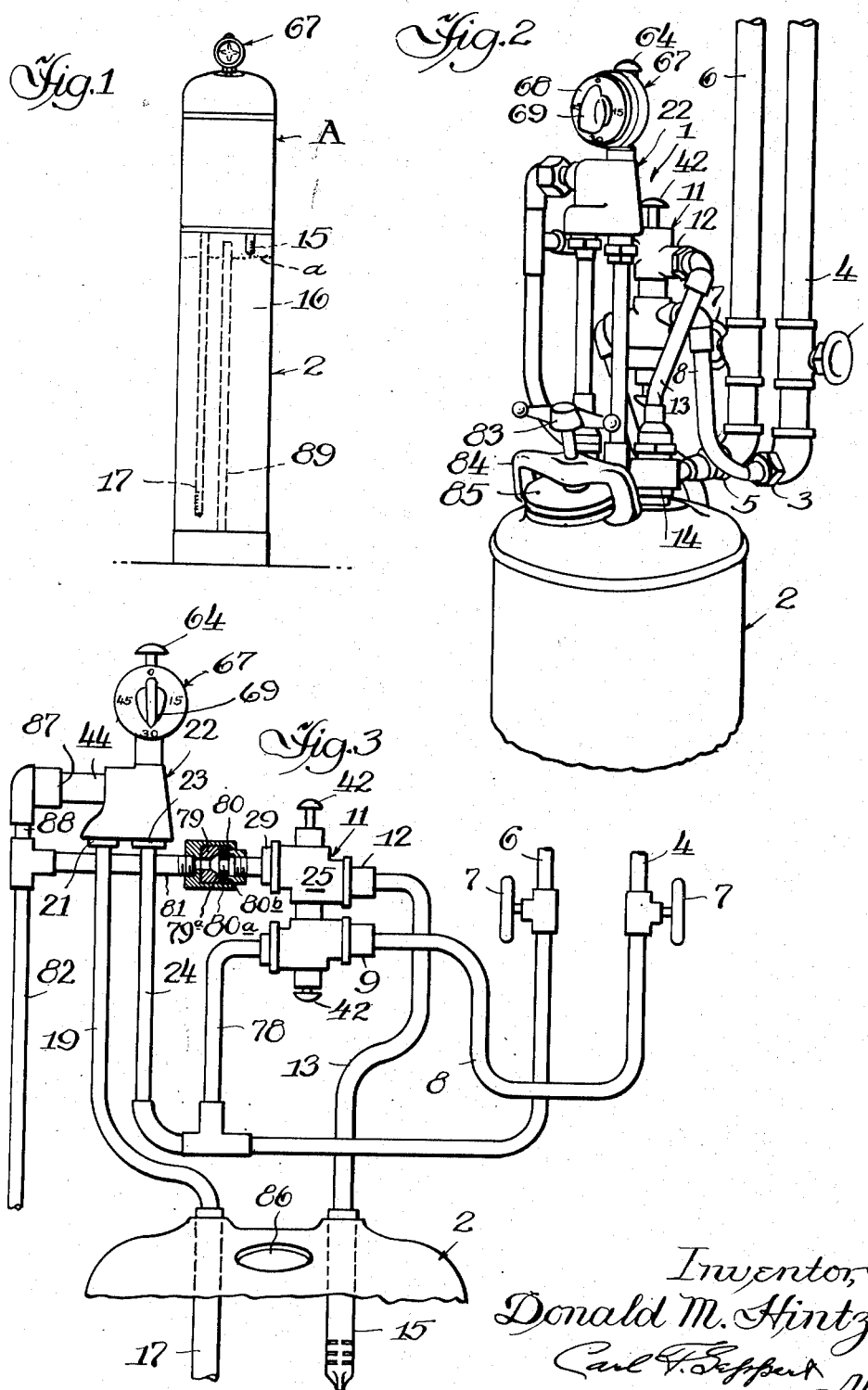

March 23, 1954 — D. M. HINTZ — 2,673,182
APPARATUS FOR SOFTENING, FILTERING, OR CONDITIONING WATER
Filed May 28, 1949 — 3 Sheets-Sheet 2
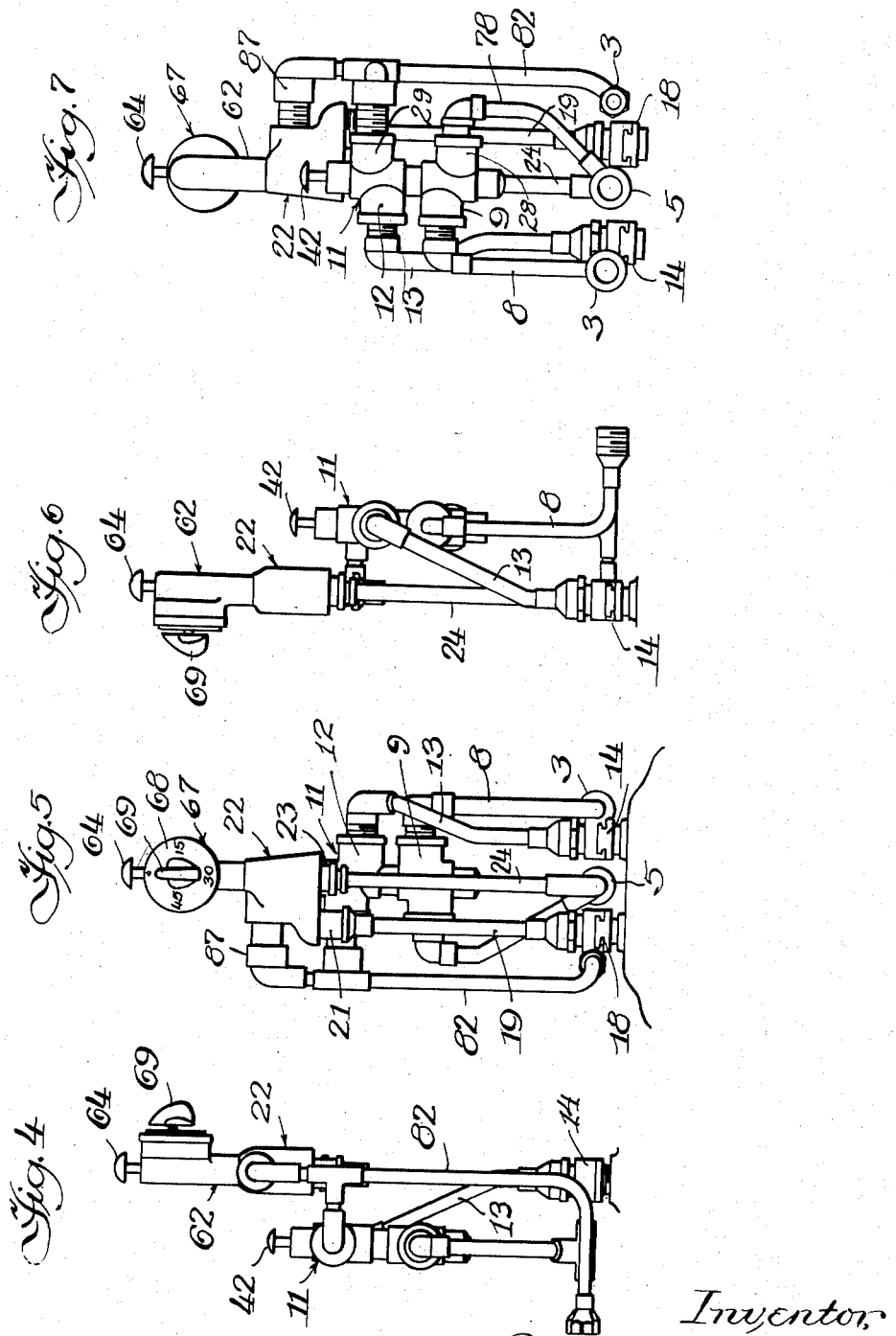
Inventor,
Donald M. Hintz

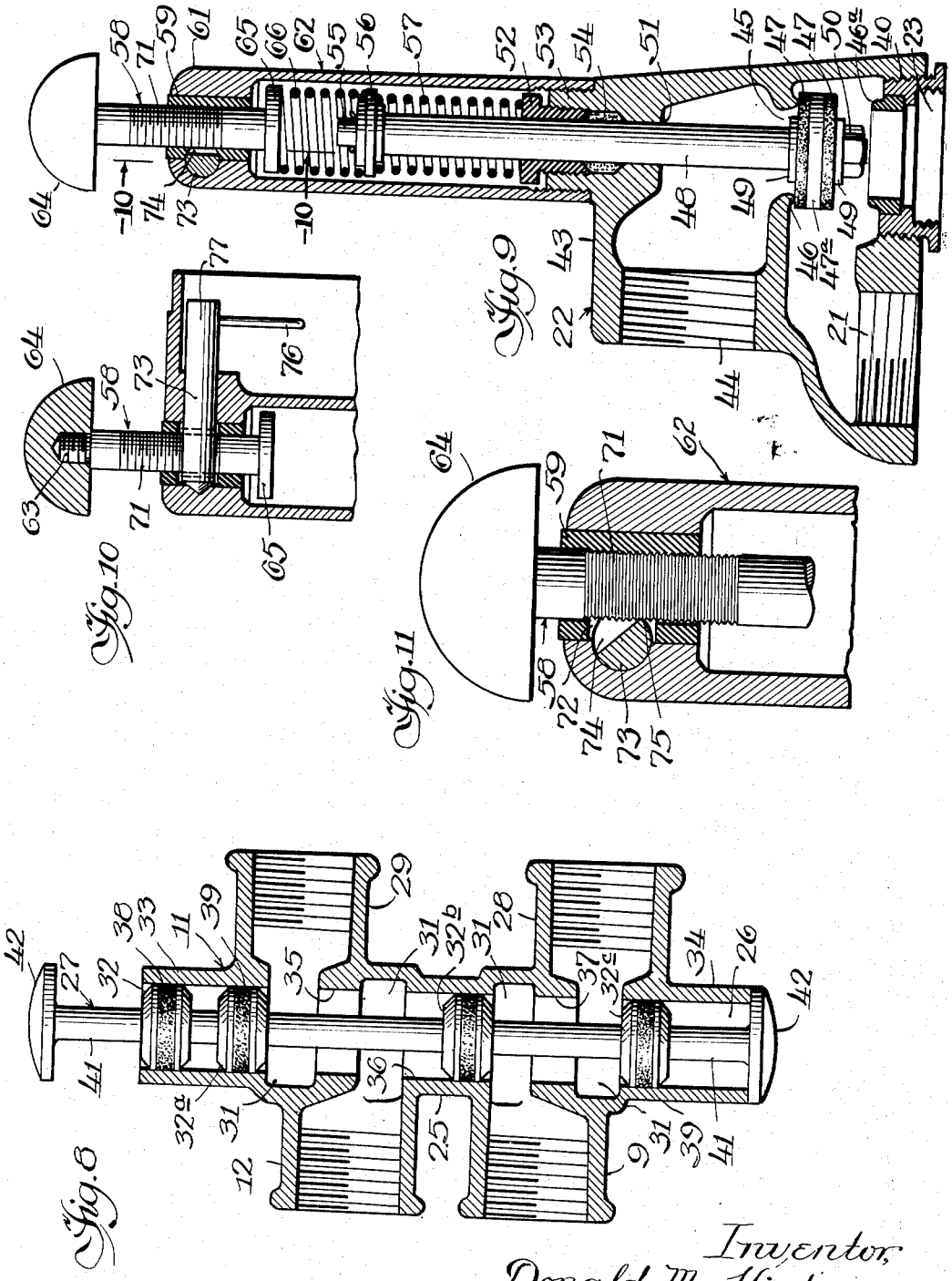

Patented Mar. 23, 1954

2,673,182

UNITED STATES PATENT OFFICE 2,673,182

APPARATUS FOR SOFTENING, FILTERING, OR CONDITIONING WATER

Donald M. Hintz, Northbrook, Ill., assignor to Culligan, Inc., Northbrook, Ill., a corporation of Delaware Application May 28, 1949, Serial No. 96,010

2 Claims. (Cl. 210—24)

The present invention relates to a novel apparatus or mechanism for continuously supplying filtered soft water and especially to a novel system, means and manner of regenerating the materials, minerals or zeolites employed in the softening, filtering or conditioning of water.

Among the objects of the present invention is the provision of a novel installation for the softening, filtering or conditioning of water in which the water treating or conditioning material in the tank may be simply and quickly regenerated in situ whenever that becomes necessary or desirable to maintain the desired efficiency in the system. However, the unit is so constructed, designed and arranged that the tank may be quickly and easily removed by the service operator or dealer and taken to his establishment periodically for more complete regeneration, sterilization, addition or replacement of the minerals, and such other servicing as may be required, all without interruption in the conditioned or filtered soft water supply for the household. To accomplish this without interruption, all that is required is the temporary replacement of the tank by a service tank supplied by the service operator or dealer for use until the original tank is returned and installed.

Furthermore, should there be any accidental damage or need for replacement parts, the present installation permits the prompt disconnection, removal or replacement of not only the tank but also the top assembly or regeneration equipment. This permits the tank to be replaced or the top assembly to be factory serviced with no interruption in the supply of filtered soft water.

The present invention further comprehends the provision of a novel regeneration system for the regeneration of the minerals in a water softener or conditioning tank without removal of the tank. The Culligan Zeolite Company has developed and for many years has been continuously operating a soft water or water conditioning service throughout the United States wherein portable cylinders containing water softening, conditioning or filtering minerals such as zeolite have been installed in homes in every section of our country. These tanks are owned by a local servicing company acting as the service operator or dealer installing and periodically servicing the tanks. This servicing most generally consists of removing each tank after it has been in service for a prescribed period of time and based generally upon the quantity of water to be treated or consumed, to permit regeneration of the minerals, and replacing such tank with another of similar dimensions and construction in which the minerals have been regenerated. This servicing operation is disclosed in Culligan Patent No. 2,252,065, granted August 12, 1941. This replacement due to a unique development in slip connections with which each tank is equipped is accomplished quickly and easily by the service man so that there is no interruption in the supply of conditioned or filtered soft water.

This system of periodically servicing by replacing such service tanks after they have been in use for a prescribed or predetermined period and taking the tanks so removed to the dealer's or service operator's establishment where the minerals or zeolites therein are regenerated and the tanks made ready for reuse has been highly successful and the service is being installed in an ever increasing number of homes. Nevertheless, many people are interested in purchasing and owning outright their equipment or unit for the softening, filtering or conditioning of water, particularly if they are assured that the regeneration operation can be successfully accomplished with little or no effort, and that the supplier or service operator is a national and highly reputable organization experienced in the field, making available to the purchaser a full and complete service of the entire unit periodically or whenever desired or required.

In the present novel apparatus, it is contemplated to employ a tank of substantially the same dimensions and provided with the same slip connections as the interchangeable and removable service tanks or units now employed whereby the service operator may easily and readily substitute one of his service tanks for the tank of the present installation and remove the latter to his plant for most complete regeneration, sterilization, addition to or replacement of the minerals or zeolites, repair, etc., after which the original tank is returned and installed and the tank of the service operator removed. It will thus be evident that the efficiency of the original tank may be maintained indefinitely at a high level, all without interruption of the filtered soft water or conditioning service, and at little expense to the owner.

The present invention further comprehends a novel top assembly or regeneration unit that is readily attached to or detached from the tank and which although manually controlled, initiates a sequence of automatic operations that relieves the operator of the drudgery and mess incident to prior permanent installations.

A further object of the present invention is the provision of a novel regeneration control system for a water softening, filtering or conditioning unit whereby to most efficiently and effectively carry out the sequence of steps or cycle of operation in backwashing, salting or other treatment and rinsing required in the periodic regeneration of the bed of minerals or zeolites employed.

A still further object of the present invention is the provision of a novel combination and arrangement of manually actuated or initiated valves for automatically carrying out the steps of backwashing, draining off a predetermined quantity of water to allow for the insertion of a requisite amount of salt or other regenerant, salting or other treatment, rinsing and returning the unit to service operation. This sequence or cycle of operations to complete regeneration is quickly and easily accomplished with a minimum of effort and attention by the operator.

The present invention further comprehends a novel regeneration unit or system so constructed and arranged as to eliminate any guesswork as to the quantity of salt or other regenerant required for the salting or treating operation. In addition, the novel drain arrangement eliminates any spillage of the brine or other regenerant as well as any external corrosion or unsightly appearance caused thereby in prior systems.

Another object of the present invention is the provision of a novel means and manner of controlling the rate of flow through the regeneration system regardless of the inlet water pressure. Thus the system is equally adapted for use where there is a considerable variance in the water pressure such as encountered in city water supplies as well as private well supplies.

Yet another object of the present invention is the provision of a novel valve construction that operates effectively and efficiently at any pressure encountered in domestic water systems. One of the difficulties frequently encountered in water conditioning systems is the provision of a valve that will operate satisfactorily at water pressures of approximately 100 lbs. per square inch. Pressures in this range and much higher are effectively controlled by the present valve assembly.

A further object of the present invention is the provision of a novel manually initiated and time-controlled valve assembly that automatically returns the water softening or conditioning unit to normal servicing operation after the expiration of a predetermined period of time.

The present invention further comprehends a novel means and manner of automatically draining from the unit the proper amount or quantity of water to allow for the insertion of a predetermined amount of salt or other regenerant required for regeneration. The unit is so constructed and designed as to eliminate any guesswork concerning the amount or quantity of the regenerant to be added.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawings:

Figure 1 is a view in front elevation of the novel water softening, filtering or conditioning apparatus completely assembled.

Fig. 2 is an enlarged view in perspective with the hood removed of the novel regeneration unit or top control assembly for the water softening, filtering or conditioning apparatus, and showing the manner of mounting the assembly upon the upper end of the tank.

Fig. 3 is an exploded or expanded view of the regeneration unit or top assembly, and diagrammatically showing the relationship of the parts of the regeneration unit as applied to the tank and their connection with the inlet and outlet for the water to be treated.

Fig. 4 is a view in elevation of one side of the top assembly or regeneration unit.

Fig. 5 is a view in front elevation of the regeneration unit or assembly.

Fig. 6 is a view in elevation of the other side of the regeneration unit or assembly, the side being opposite to that shown in Fig. 4.

Fig. 7 is a view in rear elevation of the novel regeneration unit or assembly.

Fig. 8 is a view in vertical cross section through one of the control valves.

Fig. 9 is a view in vertical cross section through another of the control valves.

Fig. 10 is a fragmentary view in vertical cross section taken on the line 10—10 of Fig. 9.

Fig. 11 is an enlarged view in vertical cross section of the upper end of the push-button control of Fig. 9, but with the button depressed and held in lowered position by the threaded or serrated shank of the valve plunger.

Referring to the disclosure in the drawings and more particularly to the novel illustrative embodiment selected to illustrate the present invention, the novel regeneration unit or control assembly 1 is shown mounted upon a water softening, filtering or conditioning tank 2 for supplying conditioned or filtered soft water of highest quality for drinking, bathing, washing and all other household uses. When in normal servicing operation, this assembly is substantially enclosed by a hood or cap A (Fig. 1).

This regeneration unit or control assembly is connected by a detachable coupling 3 to an inlet pipe or conduit 4 through which enters the water to be treated, and by a detachable coupling 5 to an outlet or service pipe or conduit 6 for discharge of the treated or filtered soft water after passing through the minerals or zeolite in the treating tank 2. The inlet pipe 4 and outlet or service pipe 6 are each shown as provided with a manually controlled shut-off valve 7.

In the normal softening, filtering or conditioning operation for treating the raw or untreated water entering through the inlet pipe 4 and with the valves 7 open to permit the uninterrupted passage of the water therethrough, the entering hard or untreated water passes through a tube or conduit 8, enters a port 9 in a manually controlled valve 11 (Figs. 2 to 8, inclusive, but with the valve in its normal lowered position rather than the raised position of Fig. 8), passes upwardly through the valve and outwardly through an uncovered port 12 into and through a tube 13 and slip connection 14 connected with the inlet manifold 15 for discharging and dispersing the entering water into the top of the tank. This water passes downwardly through a bed 16 of minerals or zeolite extending approximately to the dotted line a, for softening, filtering, conditioning or treating the raw water. The water so treated is collected at and passes through an outlet manifold 17, slip connection 18, through a tube 19 into a port 21 of a valve 22 (Fig. 9), outwardly through a port 23 in this valve and through a tube 24 and coupling 5 for discharge into the outlet or service pipe 6 for supplying the conditioned or filtered soft water for household use.

The manually controlled valve 11 (Fig. 8) comprises a housing 25 having a longitudinal bore 26 providing a cylindrical passage therethrough in which is slidably mounted a valve plunger or piston 27. In addition to the ports 9 and 12, the valve housing is provided with ports 28 and 29 offset with respect to the other two ports, and each port opening into an annular recess 31. The slidable valve plunger or piston 27 is provided with suitable spaced heads or lands 32, 32a, 32b and 32c, all substantially conforming to the longitudinal and cylindrical bore or interior of the housing at the upper and lower ends 33 and 34 and at the intermediate cylindrical surfaces 35, 36 and 37. Each head or land is provided with an annular, outwardly opening channel 38 adapted to receive a resilient O ring 39 for sealing contact with the cylindrical valve seating surfaces 33 to 37 inclusive, of the housing.

Each end 41 of the valve plunger or piston is provided with a knob or push button 42 with the upper one in position to be lowered from the regenerating or by-pass position in which ports 9 and 28, and ports 12 and 29 are in open communication (Fig. 8), to the normal operating or servicing position in which the head or land 32a is in sealing contact with the cylindrical valve seating surface 35 and the head or land 32b is in sealing contact with the cylindrical valve seating surface 37. In this latter position the ports 9 and 12 are in open communication.

The control valve 22 is shown in detail in Figs. 9 to 11 inclusive, and includes a valve body or housing 43 having a pair of adjacent and downwardly opening ports 21 and 23 and a laterally opening port 44 communicating with the port 21 through a passage 45 encompassed by a valve seat 46. To control flow through the passage 45 and also through the port 23 provided with an adaptor 40 having an upstanding valve seat 46a, a pair of opposed sealing rings or resilient washers 47 are carried at the lower end of a longitudinally or vertically movable valve stem 48. These resilient sealing rings 47 are held in spaced relation by a rigid metal washer 47a and by smaller metal washers 49 and a lock nut 50, and are adapted to be moved into and out of engagement with either the upper valve seat 46 or the lower valve seat 46a by longitudinal movement of the valve stem 48. The valve stem is slidably carried in a bore 51 in the housing or valve body 43 and in a packing nut 52 threaded into an upstanding threaded collar 53 at the upper end of the valve housing or body. To seal against leakage a packing 54 is provided between the packing nut 52 and collar 53.

The upper end 55 of the valve stem 48 is reduced and upon this reduced end is detachably mounted a stepped washer or collar 56. Between the stepped lower face of this washer and the upper surface of the packing nut 52 is provided a relatively long coil spring 57 encompassing the valve stem whereby the valve or sealing washer 47 is spring-biased to its elevated, closed position against the valve seat 46. To lower the valve against the pressure of the spring 57 there is provided a longitudinally slidable valve plunger 58 movable in bearing 59 provided in the upper end 61 of a timer housing 62, the lower end of which is detachably and threadedly mounted on externally threaded surface of the collar 53.

The valve plunger 58 is threaded at its upper reduced end 63 to receive a knob or push button 64, and at its lower end carries a washer or collar 65 locked in position by any suitable attaching means. Bearing against the undersurface of this washer or collar and seating upon the upper surface of the washer or collar 56 is a coil spring 66, whereby depressing the knob or push button 64 and the valve plunger 58 the coil spring 66 is compressed and it in turn depresses the valve stem 48 against the compression spring 57, whereby the upper resilient sealing washer 47 is unseated or moved away from the valve seat 46 and thereby uncovers the passage 45 to the lateral opening or port 44 in the valve housing or body 22. Simultaneously, however, the lower sealing washer 47 engages the valve seat 46a controlling flow or passage through the port 23, and thereby closes this port and prevents passage to the tube 24 discharging into the service pipe 6.

A timer or timing mechanism 67 on the housing 62 includes a dial 68 calibrated in minutes or other suitable designations of time, and an indicator or pointer 69 to permit the operator to set the timer for any contemplated or required period of time whereupon the timer automatically releases the valve plunger 58 and the coil spring 57 elevates the valve stem 48 to seat the upper sealing ring or washer 47 against the valve seat 46 and thereby close the valve 22 against the passage of water to the port 44.

To hold the valve plunger 58 in its lowered position in which the port 21 is in communication with the port 44 through the passage 45, and until automatically released by the timer, the stem of the plunger is provided with closely spaced threads or serrations 71 and adjacent thereto and transversely and rotatably mounted in the timer housing 62 and in a slot 72 in the bearing sleeve 59 is a ratchet pin 73. This pin is slotted or recessed at 74 whereby when the ratchet pin 73 (Figs. 9 and 11) is rotated in a counter-clockwise direction the lower corner or edge 75 of the ratchet pin engages an adjacent thread or serration on the stem of the plunger 58 and locks the plunger against upward movement. However, a trip lever 76 connected to the outer end 77 of the ratchet pin 73 and tripped when the timer reaches the end of the period for which it is set, rotates the ratchet pin in a clockwise direction whereby it is disengaged from the threads or serrations 71 and the valve plunger and knob and the valve stem are raised to their elevated positions by the coil springs 66 and 57, respectively.

In the normal operation of softening, filtering or conditioning the untreated water and assuming the valves 7 in the inlet and outlet pipes are in open position and the knob or push button 42 of the valve 11 is in its normal operating or down position and the knob or push button 64 of the valve 22 is in its up or raised position, water enters through the inlet pipe 4, valve 7 and coupling 3 into the tube 8. From the tube 8 it passes through the inlet port 9 of the valve 11, upwardly through the valve body and outwardly through the port 12, through the tube 13 and slip connection 14 into the inlet manifold 15 disposed on the interior of the tank 2. The untreated water is dispersed through the slots in the inlet manifold and then passes downwardly through the bed of minerals or zeolites 16 in the softener tank, is collected at the lower distributor or slotted end of the outlet manifold 17 and passes upwardly therethrough, through the slip connection 18, outlet tube 19 and into the port 21 of the valve 22. As the valve 22 is in raised position (Fig. 9), the treated water passes downwardly through the port 23 in the valve 22, through the tube 24, coupling 5, valve 7 and outlet or service pipe 6.

Whenever it is desirable or necessary to regenerate or reactivate the minerals or zeolites in the tank 2, such regeneration operation is initiated by raising the push button or knob 42 on the valve 11. This initiates the backwashing operation in which the raw or untreated water entering through the inlet pipe 4 passes upwardly through the tube 8 and intake port 9 of the valve 11. As the push button or knob 42 has been raised to its up position and the spaced heads or lands 32, 32ᵃ, 32ᵇ and 32ᶜ are positioned as shown in Fig. 8, the water cannot pass upwardly through the valve 11 and outwardly through the port 12 but instead passes outwardly through the port 28 and downwardly through a tube 78 connected to the tube 24.

The raw or untreated water passing through the tube 78 enters the tube 24 and passes into the valve 22 through the port 23, although as the valve 7 in the service pipe 6 remains open, this hard or untreated water is available for use in the household during this backwashing sequence or cycle. With the knob or push button 64 in its raised position during this cycle of operation, the water entering the valve 22 through the port 23 discharges therefrom through the port 21 into the tube 19. The flow continues through the slip connection 18 and what is normally the outlet manifold 17. This water then leaves the slotted lower end of the outlet manifold 17 and is dispersed thereat into the minerals 16 at the bottom of the softener tank 2. It then flows upwardly through the minerals or softening material and leaves through what is normally the slotted inlet manifold 15, slip connection 14, tube 13 and enters the port 12 of the valve 11. The water leaves the valve 11 through the outlet port 29 and passes through a rate-of-flow controller comprising a seat 79 and a deformable resilient washer 80 having a controllable orifice 80ᵃ therethrough of substantially less diameter than the adjacent inner marginal edge 79ᵃ of the seat, and a retainer ring 80ᵇ for the washer. This flow control maintains a constant rate of flow during the backwashing operation regardless of the inlet pressure on the unit. From the rate-of-flow controller the water flows into and through a tube 81 which is connected to a drain pipe 82 to discharge. This backwashing operation is carried on for a length of time depending upon the turbidity of the water being treated and normally varies from approximately five to fifteen minutes.

Upon completion of the backwashing cycle salt or other regenerant is added to the tank 2 to accomplish the desired regeneration of the softening material or minerals. In this cycle of the operation the position of the controls is unchanged so that the knob or push button 42 of the valve 11 is in its up or elevated position and the knob or push button 64 of the valve 22 is in its up or elevated position. However, the raw water supply valve 7 in the inlet pipe 4 is now closed.

As the backwashing cycle left the softening unit open to drain, the pressure in the softener tank 2 is relieved through the drain tube 82, the end of which extends downward for a sufficient length to create a siphon leg. Then with the supply valve 7 closed, the handle 83 (Fig. 2) is loosened and the yoke 84 and cover plate 85 are removed from the opening 86 leading to the interior of the tank at the top thereof. The removal of the cover plate 85 allows air to enter the opening 86 which initiates the operation of the siphon drain due to the fact that the drain pipe 82 extends downward and below the horizontal plane of the openings or slots in the manifold 15.

During the operation of the siphon drain the flow of water is from the softener tank 2 into the openings or slots in the manifold 15, upwardly through the slip connection 14 and tube 13 into the port 12 of the valve 11. This water then leaves through the port 29 of the valve 11, through the controllable orifice 80ᵃ in the annular resilient member or washer 80 of the rate-of-flow controller into the tube 81, and outwardly and downwardly through the drain pipe 82. When the water in the softener tank 2 reaches the level of the upper slot in the inlet manifold 15, the siphon drain ceases to operate. To facilitate treating or salting of the minerals, the distance from the top of the softener tank 2 to the top slot in the inlet manifold 15 is so calibrated as to allow for the displacement of the exact quantity or amount of salt or regenerant required for the regeneration cycle. As soon as the siphon drain has stopped draining water from the tank 2, space is afforded for the prescribed amount of salt or regenerant and which is added to the tank through the opening 86 until the upper end of the tank is filled. Thus the quantity of regenerant need not be weighed or measured as the prescribed amount will fill the softener tank to the neck of the opening 86. However, it is intended that the prescribed or required quantity of salt or regenerant be packaged as a matter of convenience. After the regenerant has been added, the cover plate 85, yoke 84 and handle 83 are tightened in place so as to close the opening.

The rinsing and subsequent return to normal service of the apparatus is accomplished by operation of the valve assembly including the valve 22 and the timer or timing mechanism 67. In this cycle of the operation, the knob or push button 42 of the valve assembly 11 is depressed. The timer 67 then is set for a predetermined period of time. Assuming the period to be 60 minutes, the indicator or pointer 69 is set for that time period, after which the knob or push button 64 of the valve 22 is depressed and the valve stem 48 (see Fig. 9) is thereupon lowered and unseating the upper sealing ring or washer 47 from the valve seat 46, but closing the port 23 by seating the lower resilient washer 47 against the valve seat 46ᵃ.

With the supply valve 7 in the inlet pipe 4 open the water flows from the inlet 4 through the open valve 7, through the coupling 3 and into the tube 8. From the tube 8 the hard or raw water enters the valve port 9 of the valve 11 and passes outwardly through the port 12 into and through the tube 13, through the slip connection 14 and into the inlet manifold 15. The flow of water is dispersed laterally through the slots or openings in the end of the manifold, passing downwardly through the softening material or minerals and such flow dissolves the salt or regenerant in the tank. The brine or regenerant solution then collects at the outlet manifold 17 adjacent the bottom of the tank and passes upwardly through this manifold. The flow continues upwardly through the slip connection 18 and tube 19 and into the port 21 of the valve 22. As the knob or push button 64 of the valve 22 is in its lowered or depressed position with the upper sealing washer 47 out of contact with the valve seat 46 and the lower sealing washer 47 in sealing contact with the valve seat 46a, the port 44 is opened and the port 23 is closed whereby the brine or solution flows outwardly through the port 44 and through another rate-of-flow controller 87 similar to that previously described and which latter governs the flow rate during the rinse period regardless of the inlet water pressure. The flow continues downward through the tube 88 and drain tube 82 to waste.

If the timing mechanism 67 is set for 60 minutes, this flow will continue for that period of time or for any other period for which the timer mechanism is set. The regeneration cycle having then been completed, the timer through the trip lever 76 rotates the ratchet pin 73 in a clockwise direction from the position shown in Fig. 11 to that shown in Fig. 9. In this latter position the plunger and valve are released and the springs 57 and 66 automatically seat the upper sealing washer 47 against the valve seat 46, thereby closing communication between the ports 21 and 44 and opening communication between the ports 21 and 23 in the valve 22. The return to service is automatically accomplished when the port 44 is closed as the port 23 is then open and the conditioned or filtered soft water from the port 23 flows through the tube 24, through the valve 7 and service pipe 6 to household use or service. Subsequent flow through the apparatus is similar to that described above for the normal servicing operation.

After regeneration has been accomplished, the water softening, filtering or conditioning apparatus remains in normal operation until the softening material or minerals again require regeneration, when the operation or cycle above described is again carried out or repeated. However, it is found that after a prolonged period of operation and repeated regeneration, and to insure maximum efficiency in the operation of the apparatus, that periodic regeneration, sterilization and other servicing at the service operator's establishment may be required from time to time. This is accomplished by bodily removing the tank and servicing it at the operator's plant or service station where all the necessary services or equipment are available. This may be readily accomplished by means of the slip connections 14 and 18 which are of the type and construction disclosed in the Culligan Patent No. 2,265,268, granted December 9, 1941, and comprising complementary male and female members, one of which is provided on each of the inlet and outlet couplings of the tank and the other provided on each of the inlet and outlet tubes 13 and 19 of the regeneration assembly. Thus by reason of these slip connections, the tank 2 or the regeneration assembly 1 may be readily and easily removed for servicing or replacement.

When the tank 2 requires servicing that can-
not be properly accomplished in the home but requires the service of an experienced service operator, such operator comes to the home, removes the tank 2, replaces it with one of his standard service tanks of substantially the same dimensions as the original tank but not containing the opening 86 and closure assembly 83, 84 and 85 therefore. The replacement or service tank remains until the service operator returns and replaces the tank 2.

As the valve 7 in the service line 6 is not closed during backwashing, raw or untreated water is available for use in the household during such cycle of operation, since the water flowing through the tube 78 (Fig. 3) is free to enter the tube 24 or the tube leading to the valve 7 and service pipe 6 supplying the household requirements.

To assure cathodic protection of the tank 2 against corrosion, the present invention comprehends the use of a sacrificial or expendable anode or magnesium rod 89 of the type disclosed in the co-pending application of George H. Klumb, Serial No. 67,798, filed December 29, 1948, and in order to prevent clogging of the openings or slots in the inlet manifold 15 and the outlet manifold 17 by the calcareous coating resulting from the dissipation of the anode or rod, these manifolds are preferably insulated from the other cathodic areas of the tank and fittings.

From the above description and the disclosure in the drawings, it will be readily apparent that the present invention comprehends a novel apparatus and equipment for supplying filtered soft or conditioned water for home use, and in which the novel automatic valve-controlled regenerating unit or assembly is detachably mounted upon the softening or conditioning tank whereby the tank may be quickly removed and when the occasion arises for complete regeneration, sterilization or servicing requiring removal of the tank to the establishment of the service operator, the tank is temporarily replaced by a standard type and form of service tank used by the operator in the servicing of homes where the tanks are periodically replaced by another each time the minerals in a tank require regeneration.

Having thus disclosed the invention, I claim:

1. A water treating and conditioning system connected to the inlet and outlet pipes in the home for conditioning untreated water by passing this water prior to use through a bed of treating material for filtering and conditioning the water passing therethrough, comprising a single readily removable and detachable tank containing the treating material and provided in the top thereof with an inlet for the untreated water, an outlet for the treated water and a removable cover plate for an opening for receiving a regenerant, a compact assembly for controlling the flow through the tank and the regeneration of the contents of the tank, said assembly being mounted and supported above the tank whereby the tank may be readily positioned, removed or replaced from beneath the assembly with the inlet and outlet of the tank readily connected to or disconnected from the assembly, said assembly including means for connecting this assembly to the inlet and outlet pipes in the home, a pair of manually-actuated and plunger-operated valves having multiple passages therethrough and connected to the inlet and outlet pipes in the home and to the inlet and outlet of the tank for controlling the direction of flow through the tank and for periodically regenerating said material within the tank without disconnecting the tank from the assembly, timing mechanism for the plunger of one of said valves for releasing said plunger after regeneration has been completed and automatically returning this valve to a position in which flow is reestablished for conditioning untreated water, and complementary quick detachable slip connections on the tank and on the assembly thereabove for readily removing the tank and contents for complete regeneration and sterilization of the treating material outside the home after a predetermined period of use and repeated regeneration of its treating material in the home and replacing it temporarily with a service tank until the regenerated tank is returned to service.

2. A water softener, filter or conditioning unit to be detachably coupled to an inlet pipe supplying raw or untreated water and to an outlet pipe for delivering filtered soft water to the home for household use, comprising a single portable and replaceable tank containing minerals for the treatment of the raw water and provided with a depending inlet manifold, a depending outlet manifold and a removable closure for an opening in the top of the tank for receiving a measured quantity of salt upon removal of the closure, and a valve-controlled unit assembly having a pair of plunger-operated, multi-port valves connected with the inlet and outlet pipes and detachably connected with the inlet and outlet manifolds, the first of said valves having multiple ports one of which is connected to the inlet pipe and another to the inlet manifold for the unrestricted passage of water from the inlet pipe, through said last mentioned ports, through the inlet manifold, through the bed of materials in the tank, through the outlet manifold, through communicating ports of the other valve and into the outlet pipe, and other ports in said first valve one of which is connected to the drain and another connected to a port of the second valve, a valve plunger controlling passage through said ports of the first valve, a valve plunger for controlling passage through the ports of said second valve, timing mechanism for automatically releasing said last mentioned valve plunger, said valves and valve plungers being so constructed and arranged that operation of said plungers controls the passage of water through the tank in the normal softening and filtering operation, and when the minerals become exhausted, initiating a sequence of operations including backwashing, salting, rinsing and automatically returning the unit to normal operation for supplying the household requirements for filtered soft water, said timing mechanism automatically releasing its valve plunger and thereby reestablishing normal flow therethrough, and slip connections for quickly detaching the portable tank bodily from the valve controlled unit assembly to permit removal of the tank and its contents for reconditioning outside the home and the quick and temporary replacement of this tank with a service tank of comparable capacity until such reconditioning is accomplished.

DONALD M. HINTZ.

References Cited in the file of this patent
UNITED STATES PATENTS

| Number | Name | Date |
| --- | --- | --- |
| 1,685,817 | Kenney | Oct. 2, 1928 |
| 1,778,280 | Shetler | Oct. 14, 1930 |
| 1,873,594 | Johnson | Aug. 23, 1932 |
| 1,929,405 | Bilde | Oct. 10, 1933 |
| 1,935,458 | Pick | Nov. 14, 1933 |
| 1,958,176 | Zimmerman | May 8, 1934 |
| 2,007,068 | Beck | July 2, 1935 |
| 2,146,983 | Pick | Feb. 14, 1939 |
| 2,252,065 | Culligan | Aug. 12, 1941 |
| 2,292,801 | Slidell | Aug. 11, 1942 |
| 2,347,201 | Lindsay | Apr. 25, 1944 |
| 2,370,190 | Ralston | Feb. 27, 1945 |
| 2,482,727 | Culligan | Sept. 20, 1949 |
| 2,506,711 | Evans | May 9, 1950 |
| 2,570,258 | McGill et al. | Oct. 9, 1951 |
| 2,571,000 | Albertson | Oct. 9, 1951 |
| 2,572,082 | Welsh | Oct. 23, 1951 |
| 2,589,136 | Ralston | Mar. 11, 1952 |